July 31, 1928.
T. E. MURRAY
1,679,324
VALVE BONNET AND THE LIKE
Filed July 19, 1924
3 Sheets-Sheet 1
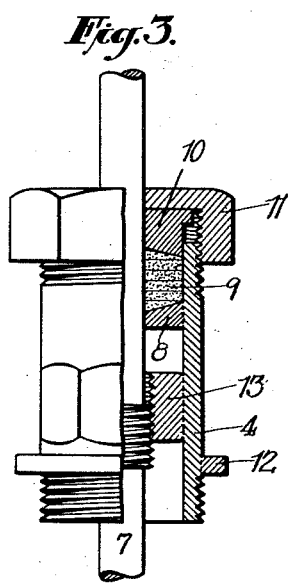
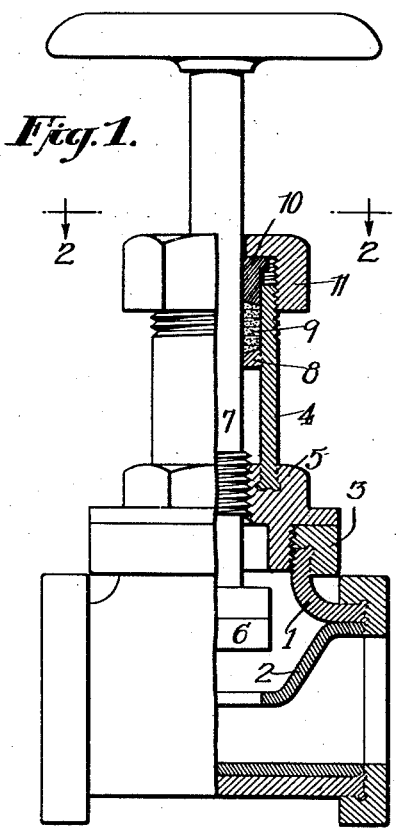
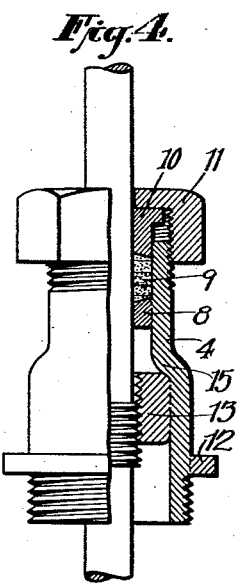
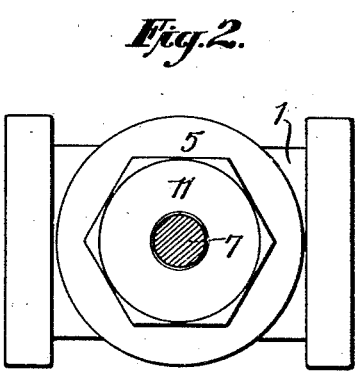
Inventor
Thomas E. Murray
By his Attorney
D. Anthony Usina July 31, 1928.
T. E. MURRAY
1,679,324
VALVE BONNET AND THE LIKE
Filed July 19, 1924    3 Sheets-Sheet 2
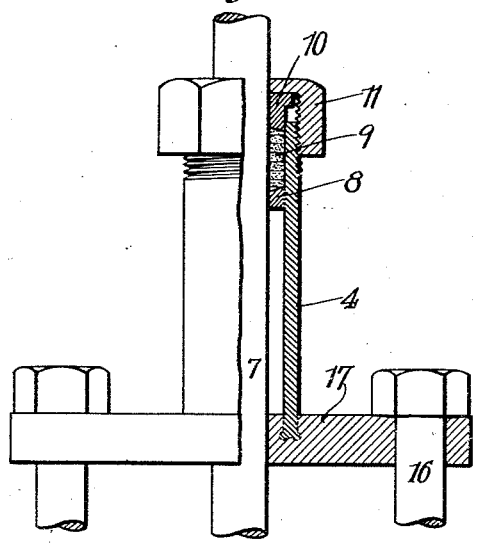
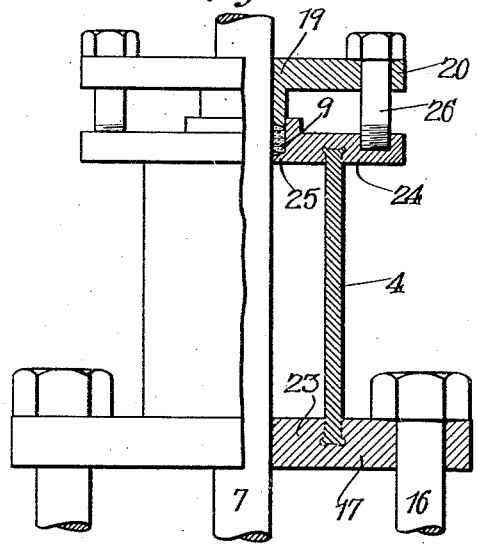
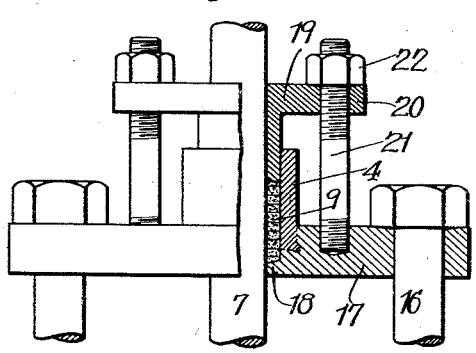
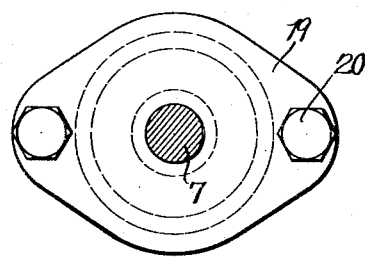
Thomas E. Murray, Inventor
By his Attorney
D. Anthony Usina July 31, 1928.

T. E. MURRAY 1,679,324

VALVE BONNET AND THE LIKE

Filed July 19, 1924　　3 Sheets-Sheet 3

Patented July 31, 1928.

1,679,324

UNITED STATES PATENT OFFICE.

THOMAS E. MURRAY, OF BROOKLYN, NEW YORK.

VALVE BONNET AND THE LIKE.

Application filed July 19, 1924. Serial No. 726,903.

In a previous application No. 718,217, I have described the production of valves and pipe fittings with separate end pieces whereby they can be fitted to pipes of different diameters; and in this and other previous applications I have described the production of such fittings from steel stampings. The present application is based on the production of valve bonnets and the like by similar methods. The accompanying drawings illustrate embodiments of the invention.

Fig. 1 is a side elevation, half in section, of a valve complete with bonnet;

Fig. 2 is a section of the same on the line 2—2;

Figs. 3, 4, 5, 6 and 7 are views similar to Fig. 1 illustrating different types of bonnet;

Fig. 8 is a plan of Fig. 7;

Figure 9:
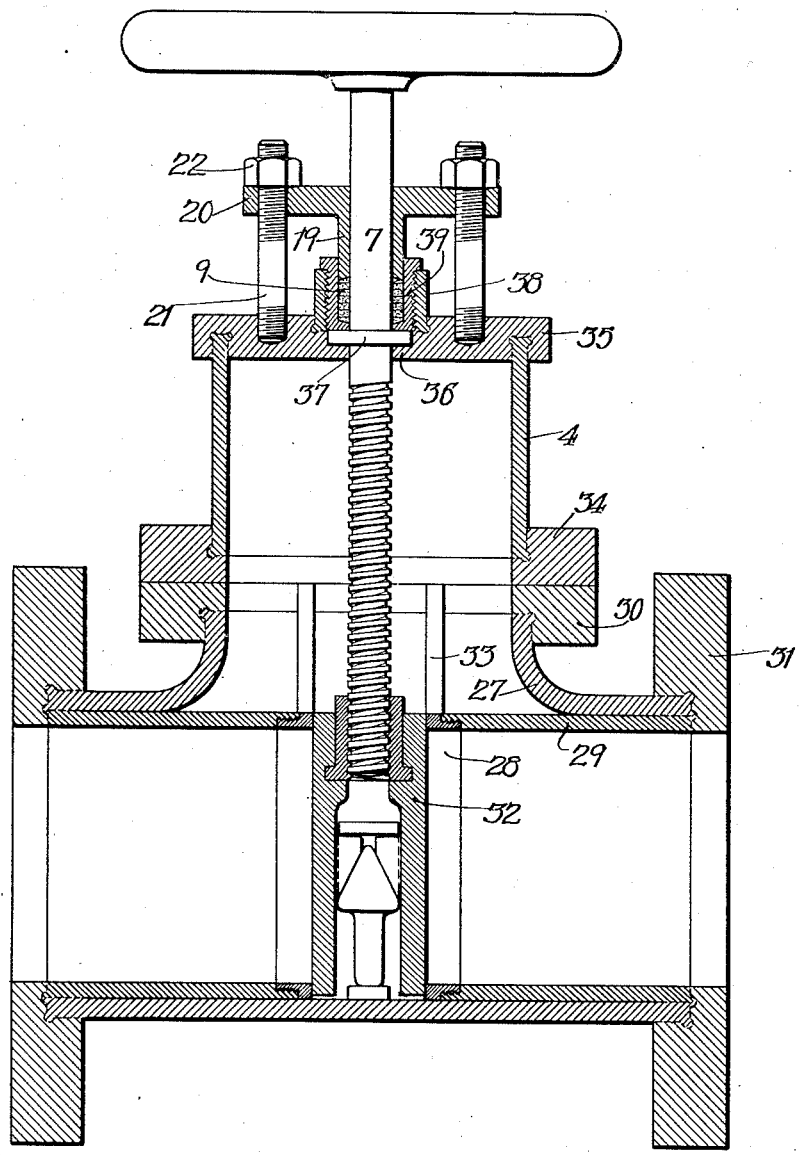
Fig. 9 is a vertical longitudinal section of a gate-valve.

Referring to Fig. 1, the valve comprises a body 1 and a seat 2 stamped out of sheet metal, with end pieces 3, these parts being welded together as described in my previous applications. The valve bonnet comprises a tube 4 on the lower end of which is welded an end piece 5 of a shape and size to fit the end piece 3 of the valve body. For larger or smaller valves the bonnet may be made with the same tube 4 and with the end piece 5 of a different size corresponding to that of the valve body.

The valve proper 6 is carried on the lower end of a stem 7 with threads engaging the internal threads on the end piece 5. An internal flange 8 is welded in the tubular portion 4 of the bonnet, making a loose fit around the stem 7. Packing 9 is arranged above the flange 8 and pressed down against the same and against the valve stem by a gland 10 which is forced down by means of a cap 11 threaded on the top of the tubular body 4.

In Fig. 3, the tubular body 4 is provided with a threaded lower end for screwing directly into the end of the valve body and has a flange 12 for bearing on the end of the valve casing. A separate internal flange 13 is welded within the tube 4 and internally threaded to receive the threads on the stem 7. The internal flange 8, packing 9, gland 10 and cap 11 are similar to those in Fig. 1.

The construction in Fig. 4 is similar to that in Fig. 3 execept in this respect. The tube 4 is of enlarged diameter in its lower half providing a shoulder 15 to take the upward thrust on the internal flange 13.

The bonnet of Fig. 5 is made for attachment to a valve by bolts 16 instead of by a direct screw thread. These bolts pass through a flange or end piece 17 which is welded onto the lower end of the tube 4 and may be made of different sizes to fit on the end piece of the valve, using a common tubular member 4 and adapting the bonnet to different valves by merely varying the size or shape of the end piece 17. The other parts are as in Fig. 1.

The bonnet of Fig. 6 is similar to that of Fig. 5 except that the end piece 17 which is welded onto the bottom of the tubular member 4 forms also the internal flange 18 for the packing 9, and the gland 19 has a flange 20 with holes for the passage of bolts 21 fastened at their lower ends in the end piece 17. The gland is pressed down by means of nuts 22 on the upper ends of the bolts 21.

According to Fig. 7, the lower end piece 17 has an inner flange 23 which merely guides the stem 7. An upper end piece 24 is welded to the top of the tube 4 and forms an internal flange 25 for the packing 9. A gland 19 is used similar to that in Fig. 6 and is pressed down by bolts 26 passing through the flanges of the gland and threaded into the upper end piece 24.

Fig. 9 illustrates a gate-valve with a body portion 27, seats 28 threaded into tubes 29 and end pieces 30 and 31 which are welded to the members 27 and 29. The compound gate 32 moves up between guides 33. The bonnet comprises a tube 4 with an end piece 34 bolted to the end piece 30 of the valve casing, and with the upper end piece 35 welded to the top of the tube. The upper end piece has an inner flange 36 on which bears a collar 37 of the valve stem. An internally threaded tube 38 is welded on the end piece 35. Into this is screwed a tube 39 the lower end of which is internally flanged to receive the packing 9 which is pressed down by a gland 19 similar to that of Fig. 6 with flanges 20 through which pass bolts 21 set at their lower ends in the member 35 and carrying nuts 22 on their upper ends by which the gland is forced down.

The tubular body may be made of a piece of ordinary commercial tubing or it may be made from a solid rod. In the latter case the internal shoulders 8 and 13, Figs. 1, 3 and 4, need not be welded but could be left as integral projections from the shell. And instead of welding the tube to the other parts at its ends, such end pieces may be united in other ways as, for example, by threading the ends of the tube and screwing the end pieces thereon; or the joint at one end may be a screw-joint and that at the other end a weld.

Though I have described with great particularity of detail certain embodiments of my invention, yet it is not to be understood therefrom that the invention is restricted to the particular embodiments disclosed. Various modifications thereof may be made by those skilled in the art without departing from the invention as defined in the following claims.

What I claim is:

1. A valve bonnet having a tubular body and a base and an internal shoulder for holding a packing for the valve stem, the body being welded to the base and shoulder.

2. A valve bonnet having a tubular body and a base separately formed and welded to the lower part of said body, and an internal shoulder member separately formed and welded into the upper part of the tubular body for holding a packing for the valve stem.

3. A valve bonnet having a tubular body, an internal shoulder for holding a packing for the valve stem and an internally threaded member separately formed and welded to the body below the shoulder to receive a threaded part of the valve stem.

4. A valve bonnet having a tubular body, a base and an internal shoulder for holding the packing for the valve stem, the body being a separate piece from the base and shoulder and being welded to these parts.

In witness whereof, I have hereunto signed my name.

THOMAS E. MURRAY.